Patented Dec. 22, 1936

2,064,867

UNITED STATES PATENT OFFICE 2,064,867

PROCESS OF PRODUCING HYDROGEN

John C. Woodhouse, Wilmington, Del., assignor, by mesne assignments, to E. I. du Pont de Nemours & Company, Wilmington, Del., a corporation of Delaware No Drawing. Application August 15, 1930, Serial No. 475,615. Renewed December 23, 1933

6 Claims. (Cl. 23—212)

This invention relates to the manufacture of hydrogen and particularly to a method of producing hydrogen from gaseous mixtures of steam and hydrocarbons with the aid of a catalyst containing a metal of the iron group.

It is the object of the present invention to provide an improved process for the production of hydrogen by the catalytic reaction of steam and hydrocarbons, the process being adapted particularly for use in converting the saturated paraffin hydrocarbons, such as methane, ethane, propane and the like.

A further object of the invention is to provide a process of manufacturing hydrogen of relatively low carbon monoxide content, such hydrogen being particularly desirable for use in the hydrogenation of oils, the synthesis of ammonia, and other reactions in which the presence of carbon monoxide is undesirable.

Other objects and advantages of the invention will be apparent as it is better understood by reference to the following specification in which the preferred embodiments are described.

In the manufacture of hydrogen from hydrocarbons and steam it is desirable to employ temperatures materially below 700° C. At temperatures of 700° C. or higher, the conversion of the hydrocarbons will result in a carbon monoxide content in the resultant gaseous mixture of 10% or more unless the steam employed is in such excess as to render the process very costly. The reason for this condition is apparent from a consideration of the reactions—

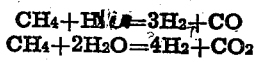

$$CH_4 + H_2O = 3H_2 + CO$$
$$CH_4 + 2H_2O = 4H_2 + CO_2$$

and the fact that the more elevated the temperature the more the first reaction is favored, whereas the second reaction is favored by relatively lower temperatures. In order, however, to obtain any substantial reaction at these desirable lower temperatures it is necessary to employ a catalyst. The use of metals of the iron group as catalysts for this process has been proposed and it has also been suggested that one or more promoters be employed therewith, especially various difficultly reducible metallic oxides.

I have discovered that improved results may be obtained in the production of hydrogen by the reaction of a gaseous mixture of steam and hydrocarbons by employing a catalyst containing a metal of the iron group, which catalyst has been subjected preliminarily to reduction by means of a carbon monoxide-containing gas and more particularly a gaseous mixture containing carbon monoxide and hydrogen. I have found further that a gaseous mixture, especially suitable for the purpose, may be prepared by thermally decomposing or cracking methanol. This may be accomplished by subjecting methanol vapor at an elevated temperature to contact with one of the known catalysts for the synthesis of methanol from carbon monoxide and hydrogen.

Employment of my method for the reduction of catalysts is not dependent upon any particular source or procedure in the preliminary treatment of the iron group metal catalysts prior to reduction. For example, I have observed the improved result in the case of the reduction of metal oxide and the metal oxalate or other compound reducible to metal may similarly be employed.

I have likewise found that catalysts of the iron group may be improved by partially reducing with hydrogen per se and subsequently completing the reduction with a carbon monoxide containing gas such, for instance, as a mixture of carbon monoxide and hydrogen. While in the working up of some catalysts it may be found advantageous to reduce with hydrogen prior to a final reduction with the carbon monoxide-containing gas, (such a method being given in Example 1 below), the complete reduction may, on the other hand, be carried on successfully with the carbon monoxide-containing gas without preliminary reduction with hydrogen alone. In any case, however, to realize the maximum advantages of my process the final reduction of the catalyst should be effected in the presence of carbon monoxide.

The temperature for the activation and reduction of the catalyst should preferably be in the range of 175–525° C. The optimum temperature of activation will in all cases be determined by the particular compound of the metal or metals being treated.

The following examples will serve to indicate the preferred procedure in carrying out the invention, it being understood, however, that the invention is not limited to the details of operation therein described. Conditions of temperature, pressure, gas composition, etc., employed in the reduction and activation of the catalysts with carbon monoxide-containing gases as well as conditions of temperature, pressure, etc., employed in the steam-hydrocarbon conversion, may vary over a wide range without departing from the invention or sacrificing any of its advantages.

*Example 1.*—Dissolve 245 grams of nickel nitrate in 1500 cubic centimeters of water. To this, with both solutions at 45° C., add gradually, while stirring, 144 grams of oxalic acid dissolved in 750 cubic centimeters of water. Wash the precipitate with water three times by decantation, dry at 120° C., ignite three hours at 400° C., form into briquets or tablets in a tableting machine and crush to 8–14 mesh. In an atmosphere of hydrogen, raise the temperature to 175° C. in one hour. Then, at the rate of 25° C. rise per hour until the temperature reaches 450° C., and at a gas space velocity of 250, reduce the product by passage thereover of a gaseous mixture of carbon monoxide and hydrogen prepared by catalytic decomposition of methanol. The resultant catalyst may be used in the steam-conversion of methane or other hydrocarbons for the production of hydrogen.

Catalysts activated in the foregoing manner have been found to produce results that could not have been expected or foreseen from any previous knowledge. Thus, for example, with a nickel catalyst activated by reduction with a carbon monoxide-hydrogen mixture, operating with a low steam ratio of 4.9 volumes of steam to 1 volume of methane, a temperature of 502° C., and an inlet methane space velocity of 300, I have succeeded in instituting and maintaining the conversion of 65% of the intake methane, whereas under the same conditions the best previous conversion with ordinary nickel catalysts, such as those reduced by means of hydrogen alone, was 45%. Other samples of the same batch of nickel catalyst, not reduced or activated by carbon monoxide and hydrogen prior to use, showed at 300 space velocity less than 1% conversion with steam:methane ratios of from 10:1 down to about 6:1 and temperatures below 585° C., and no permanent conversion capacity under these conditions below 605° C. However, using catalysts activated by carbon monoxide-hydrogen reduction, conversion as high as 45% has been obtained at a temperature of 480° C., with a steam to methane ratio of 10:1 and a space velocity of 425. This compares with conversions of less than one percent. even at temperatures as high as 550° C., when using a catalyst prepared in an otherwise similar manner but reduced by means of hydrogen alone.

Example 2.—A nickel catalyst promoted with zirconium can be prepared as follows: Dissolve 500 grams of nickel nitrate in 8 liters of water. To this, with both solutions at 45° C., add slowly 270 grams of oxalic acid dissolved in 4 liters of water. Let stand over night, wash three times by decantation, filter, make into a thick paste, and knead into the latter 63.8 grams of finely ground zirconium nitrate. Dry the material at 120° C. and ignite at 400° C. for three hours. Form the dried product into pellets or briquets in a tableting machine and crush to 8–14 mesh size. Reduce the catalyst in an atmosphere containing one volume of carbon monoxide and two volumes of hydrogen, raising the temperature to 175° C. in one hour, then 25° per hour thereafter to 400° C. The reducing gas should have a space velocity of 250 and the rate of flow and the temperature should be carefully controlled, since in view of the high activity of the promoted catalyst the exothermic side reaction of carbon monoxide and hydrogen to form methane may otherwise result in an undesirably rapid rise in temperature. When a catalyst prepared in the foregoing manner was employed in the conversion of steam and methane to hydrogen some evidence of initiation reaction was obtained even below 290° C. At 390° C. with a methane space velocity of 250 and a steam to methane volume ratio of 11:1, a conversion of 65% of the methane was obtained. This result was a substantial improvement over that yielded by a catalyst of similar composition in the reduction of which hydrogen alone was employed.

The conversion of the hydrocarbons with steam can be carried out in any suitable form of apparatus which is adapted to support the catalyst and to permit the heating thereof during the passage of the gaseous mixture.

No explanation or theory is offered as to any change in physical form or chemical composition that may occur in the catalyst in the course of the reduction or activation treatment with carbon monoxide-containing gases, or during the conversion of the hydrocarbons with steam. The term "catalyst" as employed in the claims is intended therefore to include the contact mass as prepared as well as any modified form in which it may exist during the reaction. It is likewise to be understood that where elements of the iron group are referred to in the claims I mean to include thereby these elements in the free state or in any chemical combination, e. g., with oxygen, in which they may under some conditions occur in the catalysts.

While the invention will doubtless find its widest application in the conversion of methane, since that hydrocarbon occurs most commonly among the substances that are available for the steam-hydrocarbon conversion process of producing hydrogen, such as natural gas, coke-oven gas, etc., it will be useful, nevertheless, in converting the higher homologues of methane (ethane, propane, etc.) because these react with steam even more readily than methane and other hydrocarbon gases. Unsaturated hydrocarbons may also be employed.

It will be understood that the materials used in the preparation of the catalyst, the gas or gases used in reducing the catalyst, as well as the gas or gas mixtures used in the steam-hydrocarbon conversion process, for the most satisfactory results, should be freed, prior to use, from substances detrimental to the catalyst, such as sulphur compounds, halogen compounds, etc.

Various changes may be made in the operation as described without departing from the invention or sacrificing any of the advantages thereof.

I claim:

1. In a process of producing hydrogen by reaction of a gaseous mixture of hydrocarbon and steam in the presence of an iron group metal catalyst, the step of subjecting the catalyst preliminarily to reduction by a gaseous mixture containing hydrogen and an appreciable quantity of carbon monoxide obtained by catalytic decomposition of methanol.

2. In a process of producing hydrogen by reaction of a gaseous mixture of hydrocarbon and steam in the presence of an iron group metal catalyst, the step of subjecting the catalyst preliminarily to partial reduction with hydrogen and subsequent reduction with a gas containing an appreciable quantity of carbon monoxide.

3. In a process of producing hydrogen by reaction of a gaseous mixture of hydrocarbon and steam in the presence of an iron group metal catalyst, the step of subjecting the catalyst preliminarily to reduction in an atmosphere of hydrogen at approximately 175° C. and thereafter gradually raising the temperature to a maximum of approximately 450° C. while passing a stream of hydrogen and an appreciable quantity of carbon monoxide over the catalyst.

4. In a process of producing hydrogen by reaction of a gaseous mixture of hydrocarbon and steam in the presence of a nickel catalyst, the step of subjecting the catalyst preliminarily to reduction by a gaseous mixture containing hydrogen and an appreciable quantity of carbon monoxide obtained by catalytic decomposition of methanol.

5. In a process of producing hydrogen by reaction of a gaseous mixture of hydrocarbon and steam in the presence of a nickel catalyst, the step of subjecting the catalyst preliminarily to partial reduction with hydrogen and subsequent reduction with a gas containing an appreciable quantity of carbon monoxide.

6. In a process of producing hydrogen by reaction of a gaseous mixture of hydrocarbon and steam in the presence of a nickel catalyst, the step of subjecting the catalyst preliminarily to reduction in an atmosphere of hydrogen at approximately 175° C. and thereafter gradually raising the temperature to a maximum of approximately 450° C. while passing a stream of hydrogen and an appreciable quantity of carbon monoxide over the catalyst.

JOHN C. WOODHOUSE.